Oct. 19, 1965 KEIJIRO KUBOTA ETAL 3,212,931

ELECTROSTATOGRAPHIC RECORDING MEDIUM AND A METHOD OF MAKING THE SAME

Filed May 28, 1962

INVENTORS
KEIJIRO KUBOTA
HISA OHTA
YOSHITARO OKAJIMA
SEIZO KINERI
YUJI HARASAKI
KIICHI KIRIGAYA

BY Watson, Cole, Grindle & Watson
ATTORNEYS

United States Patent Office 3,212,931

Patented Oct. 19, 1965

3,212,931

ELECTROSTATOGRAPHIC RECORDING MEDIUM AND A METHOD OF MAKING THE SAME

Keijiro Kubota, Mitaka, Tokyo, Hisa Ohta, Shinjuku-ku, Tokyo, Yoshitaro Okajima, Nerima-ku, Tokyo, Seizo Kineri, Suginami-ku, Tokyo, and Yuji Harasaki and Kiichi Kirigaya, Shizuoka, Japan, assignors to Nippon Telegraph and Telephone Public Corporation, Chiyoda-ku, Tokyo, Japan, a corporation of Japan Filed May 28, 1962, Ser. No. 198,207

Claims priority, application Japan, Feb. 2, 1962, 37/3,385

4 Claims. (Cl. 117—218)

This invention relates to an electrostatographic recording medium and a method of making the same.

The present invention relates to an electrostatographic recording medium and a method of making the same wherein, in recording such electric signal as any fixed character, sign or record of communication, an electrostatic charge pattern is formed by using the electric signal as it is.

The electrostatographic recording medium according to the present invention is formed by forming a low resistance layer of a highly polymerized electrolyte on the surface of a backing base and providing a pattern supporting layer on said low resistance layer.

An object of the present invention is to provide a recording medium wherein a clear stable record can be obtained without being substantially influenced by the atmospheric humidity variation.

Figure 1:
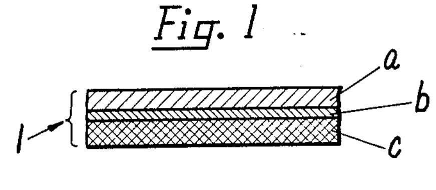
FIGURE 1 is a sectioned view showing the structure of a recording medium according to the present invention.

With reference to FIGURE 1, *a* is an upper pattern supporting layer formed of such dielectric substance as, for example, a vinyl acetate resin. *b* is a low resistance layer having a specific surface resistance lower than that of said pattern supporting layer and formed of a highly polymerized electrolyte such as, for example, sodium polyacrylate. *c* is a lower backing base made of paper. Thus the recording medium 1 is formed of three layers.

Figure 2:
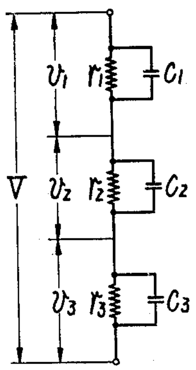
FIGURES 2 and 3 are equivalent circuit diagrams used for the explanation of the operation of the recording medium according to the present invention.

FIGURE 2 shows an example of an equivalent circuit showing the operation of a recording medium formed as shown in FIGURE 1. V is an impressed electric field. $v_1$, $v_2$ and $v_3$ are the electrical potentials of the pattern supporting layer *a*, the low resistance layer *b*, and the backing base *c* respectively. $c_1$ and $r_1$ are the capacitance and resistance components respectively between the top and bottom surfaces of pattern supporting layer *a*. $c_2$ and $r_2$ are the capacitance and resistance components respectively between the top and bottom surfaces of low resistance layer *b*. And $c_3$ and $r_3$ are the capacitance and resistance components respectively between the top and bottom surfaces of the backing base *c*.

Figure 3:
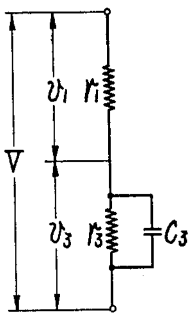

Generally, in this kind of recording system, the area of the recording medium is so much larger than that of the applied part of the electric field that, in case the electric field V for a comparatively short time is applied to the recording medium, the capacity component $c_1$ will be able to be substantially neglected. Also, the electric potential $v_2$ of the low resistance layer *b* is so much smaller than the potentials $v_1$ and $v_3$ that the resistance component $r_2$ and the capacitance component $c_2$ will be able to be omitted. Thus the comparatively large capacity component $c_3$ by the resistance $r_3$ of the backing base *c* and the low resistance layer *b* of a large area will remain as it is. Therefore, an equivalent circuit obtained by arranging the above and further simplifying FIGURE 2 is as shown in FIGURE 3. As obvious from the drawing, in order to obtain the clearest and stablest record, it is effective to make $V \approx v_1$. In order to have $V \approx v_1$, it is desirable to make $r_3$ much lower than $r_1$ or to make the capacity component $c_3$ larger so that the instantaneous charging current for $c_3$ will be increased and, as a result, the value of $v_3$ will be reduced.

In the recording medium according to the present invention, on the basis of the above mentioned theory, in order to make the surface resistance $r_2$ of the low resistance layer *b* lower so that, as a result, $c_3$ may be made larger, between the backing base and the pattern supporting layer there is formed a low resistance layer of a highly polymerized electrolyte, for example, the salt of an alginate, polyacrylate, polystyrene sulphonate, or sulphonic phenol formaldehyde.

Now, the pattern supporting layer to be used for the recording medium according to the present invention will be explained in detail below. The pattern supporting layer *a* formed of a dielectric substance is generally considered to require of a volume resistance of more than $10^{10}\Omega/\text{cm.}^2$. Further, as a result of many experiments, it has been found that the material to be used in the present invention must satisfy such conditions that it should have a low hyroscopicity, a volume resistance of $$10^{10}-10^{17}\Omega/\text{cm.}^2$$

(at $10^{18}\Omega/\text{cm.}^2$, a ground stain or the like will be caused by the static electricity generated by the slight stress at the time of recording), a high dielectric strength, a high film forming ability and the material should be cheap, nonadhesive and substantially non-toxic. That is to say, the compositions for the pattern supporting layer *a* satisfying the above mentioned conditions are polymers, copolymers or condensates, as well as mixtures thereof of any of the compounds selected from the group consisting of vinyl acetate, vinyl chloride, vinyl butyral, vinyl acetal, vinylidene chloride, acrylic ester, methacrylic ester, styrene, acrylonitrile, ethylene and silicone resins, as a solution in an organic solvent or an emulsion or suspension in which the polarity of the emulsifying or suspending agent is nonionic or anionic, said resins preferably having a softening point of more than 60° C., a water absorbency of less than 3%, a Shore hardness of more than 10 and a specific surface resistance of $10^{12}-10^{17}\Omega$. The material treated as mentioned above is applied by painting, laminating or film pasting or as a binder by mixing therein such conductive pigment as, for example, a titanium powder.

As a means of forming a low resistance layer of highly polymerized electrolyte, the backing base may be painted on the surface with said highly polymerized electrolyte by means of a coater. The layer may be formed by tub-sizing the highly polymerized electrolyte by half wetting as in the paper making process.

The highly polymerized electrolyte is so effective in its ability to form a film which is resistant to organic solvents that, even if the pattern supporting layer is formed of a resin soluble in organic solvents, the surface of the low resistance layer formed of such highly polymerized electrolyte will not be damaged, said resin will not penetrate the backing base, and there will be no defect causing difficulty in reading the record due to coloring or of reduction of the resistance of the pattern supporting layer due to humidity variation as in such conventional low resistance layer forming substance as powders as of carbon black, aluminum or copper or such surface active agent as an inorganic salt or a polyolefin derivative having ionic conduction. Therefore a record stable and clear irrespective of any low or high humidity will be obtained in the recording medium of the present invention.

Figure 4:
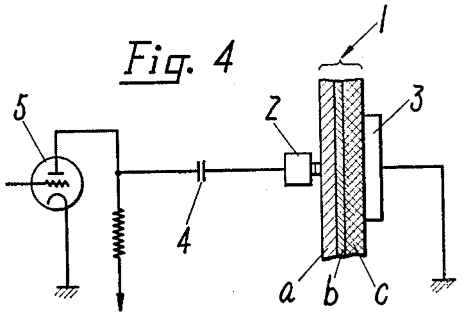
FIGURE 4 is a view of a recording apparatus showing an example of using the recording medium of the present invention.

An example of the case wherein a recording apparatus is formed by using a recording medium according to the present invention shall now be explained with reference to FIGURE 4. In FIGURE 4, 1 is a recording medium. 2 is a character plate. 3 is a ground plate. In such apparatus, if a high voltage generated from any proper electric circuit is applied on the character plate 2 and ground plate 3, an electrostatic charge pattern of the same polarity as of the character plate 2 will be obtained on the pattern supporting layer side of the recording medium 1 held between the character plate 2 and ground plate 3. Although, in the drawing, the recording medium and the plate are shown to be in contact with each other, in such construction as will reduce the fogging of the pattern on the recording medium, there may be some clearance between them. Further, the construction of the plate may be needle-shaped.

Examples of the recording medium according to the present invention shall be explained in the following.

*Example 1*

A backing base 70$\mu$ thick was formed by adjusting 70 parts of pulp mixed LBKP (bleached hard wood pulp) and 30 parts of NBSP (bleached soft wood pulp) so as to be of a freeness of 60° SR and adding 1 part of rosin and 5 parts of clay. A low resistance layer of an applied amount of 3 g./m.$^2$ and 3$\mu$ thick was made by painting said backing base on the surface with an aqueous solution of 1% sodium alginate by means of a knife coater. A pattern supporting layer was made by painting said low resistance layer on the surface with an ethyl acetate solution of a vinyl acetate resin by means of a roll coater so that the applied amount might be 7 g./m.$^2$ and the thickness of the coating might be 7$\mu$. Thus an electrostatographic recording medium was obtained.

The specific surface resistance of the pattern supporting layer at a humidtty of 30% RH was about $2\times10^{14}\Omega$. The specific surface resistance of the low resistance layer before it was coated with the pattern supporting layer was $1\times10^{10}\Omega$. The volume resistance of the backing base was $3\times10^{11}\Omega$/cm.$^2$. (In this kind of recording medium it is not proper to represent the resistance with the specific volume resistance but its apparent resistance value is a problem. Therefore, in the present invention, it is converted to a value obtained with a plate of 1 cm.$^2$.)

The recording medium obtained as mentioned above was used in such apparatus as is shown in FIGURE 4. When a record was made with an impressing voltage of 1,000 v. for an impressing time of 50$\mu$S and was developed with a powder so as to be a visible pattern so that the recorded state might be seen, a very clear pattern was obtained.

*Example 2*

A backing base 60$\mu$ thick was formed by adjusting 60 parts of pulp mixed LBKP (bleached hard wood pulp) and 50 parts of NBSP (bleached soft wood pulp) so as to be of a freeness of 80° SR and tub-sizing 10 parts of ammonium polyacrylate in half wetting of paper in the paper making process. A pattern supporting layer 10$\mu$ thick was formed by painting said backing base on the surface with a toluene solution of 30% silicone resin by means of a roll coater. Thus a recording medium was obtained.

When this recording medium was tested, the specific surface resistance of the silicone painted pattern supporting layer was $7\times10^{15}\Omega$ at a humidity of 30% RH, the volume resistance of the backing base was $1\times10^{8}\Omega$/cm.$^2$ and the surface smoothness as tested with a Beck smoothness tester was 2000 and was favorable. When a record was made in the thus obtained recording medium as in Example 1, a favorable result was obtained.

As shown in the above examples, at an atmospheric humidity of 30 to 90% RH, if the volume resistance of the low resistance backing base is less than $10^{8}\Omega$/cm.$^2$ in a two-layer recording medium and if the specific surface resistance of the low resistance layer is less than $10^{10}\Omega$ in a three-layer recording medium, a stable and highly clear record will be obtained. However, this value is different depending on the dielectricity, area and thickness of the backing base and is not constant.

What is claimed:

1. In an electrostatographic recording medium wherein an electrostatographic charge pattern is formed directly by the application of an electric field, the improvement wherein the recording medium comprises a backing base consisting of paper, a pattern supporting layer consisting of a resinous dielectric substance adapted to support an electrostatographic image and an intermediate layer of low electrical resistance interposed between said backing base and said pattern supporting layer, said intermediate layer being formed from the salt of a highly polymerized electrolyte taken from the group consisting of sodium alginate and ammonium polyacrylate.

2. In an electrostatographic recording medium as claimed in claim 1 wherein said pattern supporting layer consisting of a dielectric substance is taken from the group consisting of silicone and vinyl acetate resins.

3. In an electrostatographic recording medium wherein an electrostatographic charge pattern is formed directly by the application of an electric field, the improvement wherein the recording medium comprises a backing base consisting of paper sized with a salt of a highly polymerized electrolyte taken from the group consisting of sodium alginate and ammonium polyacrylate, the volume resistance of said sized paper being less than $$1\times10^{8}\Omega/\text{cm.}^2$$

and a pattern supporting layer consisting of a resinous dielectric substance adapted to support an electrostatographic image.

4. In an electrostatographic recording medium as claimed in claim 3 wherein said pattern supporting layer consisting of a dielectric substance is taken from the group consisting of silicone and vinyl acetate resins.

References Cited by the Examiner

UNITED STATES PATENTS

| | | | |
|---|---|---|---|
| 2,656,327 | 10/53 | Van Wirt et al. | 117—38 X |
| 2,676,896 | 4/54 | Cohen et al. | 117—139.5 X |
| 2,686,121 | 8/54 | Latham et al. | 162—165 |
| 2,936,249 | 5/60 | Hennemann et al. | 117—139.5 X |
| 3,011,918 | 12/61 | Silvernail et al. | 117—201 |
| 3,061,473 | 10/62 | Teroso | 117—139.5 |
| 3,063,872 | 11/62 | Boldebuck | 117—217 X |
| 3,075,859 | 1/63 | Relph et al. | 117—155 X |
| 3,110,621 | 11/63 | Doggett et al. | 117—218 |

OTHER REFERENCES

Journal of Physical Chemistry, vol. 64, November 1960, pp. 1790–1792.

WILLIAM D. MARTIN, *Primary Examiner.*